US011338742B2

(12) United States Patent
Inayoshi

(10) Patent No.: US 11,338,742 B2
(45) Date of Patent: May 24, 2022

(54) BRACKET FOR IN-VEHICLE DEVICE AND HOLDING DEVICE FOR IN-VEHICLE DEVICE

(71) Applicant: NIFCO INC., Yokosuka (JP)

(72) Inventor: Yuichiro Inayoshi, Yokosuka (JP)

(73) Assignee: NIFCO INC., Yokosuka (JP)

( * ) Notice: Subject to any disclaimer, the term of this patent is extended or adjusted under 35 U.S.C. 154(b) by 70 days.

(21) Appl. No.: 16/933,044

(22) Filed: Jul. 20, 2020

(65) Prior Publication Data

US 2021/0024012 A1    Jan. 28, 2021

(30) Foreign Application Priority Data

Jul. 25, 2019  (JP) .............................. JP2019-137022
Jun. 8, 2020   (JP) .............................. JP2020-099166

(51) Int. Cl.
*B60R 11/04* (2006.01)
*B60R 11/00* (2006.01)

(52) U.S. Cl.
CPC ......... *B60R 11/04* (2013.01); *B60R 2011/005* (2013.01); *B60R 2011/0026* (2013.01)

(58) Field of Classification Search
CPC ............. B60R 11/04; B60R 2011/0026; B60R 2011/005; B60R 11/0211; B81B 2201/0235; B81B 7/0019; B81B 2201/0264; B81B 2203/0315; B81B 3/0081; G01C 19/5783; G01P 1/006; G01P 1/023; G01P 15/125; G01P 2015/0831; G01P 2015/0871; G01P 21/00; G01P 15/12; G01P 3/44

(Continued)

(56) References Cited

U.S. PATENT DOCUMENTS 10,800,343 B2    10/2020  Kasai et al.
2015/0030319 A1*  1/2015  Matori ................. G03B 17/561
                                                             396/419

(Continued)

FOREIGN PATENT DOCUMENTS

EP    3173290 A1 *  5/2017
EP    3173290 A1    5/2017

(Continued)

OTHER PUBLICATIONS

Europe Patent Office, "Search Report for European Patent Application No. 20187264.5," dated Oct. 13, 2020.

*Primary Examiner* — Kathleen M Walsh
(74) *Attorney, Agent, or Firm* — Manabu Kanesaka

(57) ABSTRACT

A bracket for holding an in-vehicle device inside a window glass includes a base configured to be fixed to an inside surface of the window glass; right and left side portions protruding downward from the base; a locking member assembled so as to be movable between a first position and a second position; and at least one support portion configured to receive a supported portion provided in the in-vehicle device and inserted between the right and left side portions from a lateral direction while the locking member is located at the first position. When the locking member is moved to the second position while the supported portion is received by the support portion, the locking member is pressed against the supported portion so that the in-vehicle device is held in any of the front to rear direction and the up to down direction without rattling.

6 Claims, 16 Drawing Sheets

(58) Field of Classification Search
USPC .......................................................... 348/148
See application file for complete search history.

(56) References Cited

U.S. PATENT DOCUMENTS

| | | | |
|---|---|---|---|
| 2017/0274835 A1* | 9/2017 | Kasai | B60R 11/04 |
| 2018/0361947 A1* | 12/2018 | Matori | G03B 17/561 |
| 2018/0361949 A1* | 12/2018 | Okuda | B60R 11/04 |
| 2019/0168688 A1* | 6/2019 | Yamamoto | H04N 5/2252 |
| 2020/0262361 A1* | 8/2020 | Ueta | G03B 17/561 |
| 2020/0404138 A1* | 12/2020 | Wang | H04N 5/2254 |

FOREIGN PATENT DOCUMENTS

| | | | | |
|---|---|---|---|---|
| EP | 3323679 A1 | 5/2018 | | |
| JP | 2016-203772 A | 12/2016 | | |
| JP | 2018144712 A | * 9/2018 | | |
| JP | 2020131809 A | * 8/2020 | | B60R 11/04 |
| WO | 2018/092473 A1 | 5/2018 | | |
| WO | WO-2018092473 A1 | * 5/2018 | | B60R 11/02 |
| WO | WO-2019188664 A1 | * 10/2019 | | B60R 11/02 |

* cited by examiner

BRACKET FOR IN-VEHICLE DEVICE AND HOLDING DEVICE FOR IN-VEHICLE DEVICE

BACKGROUND

Technical Field

The present invention relates to an improvement of a bracket used to hold an in-vehicle device such as an in-vehicle camera inside a window glass on the window glass and a holding device for an in-vehicle device including the bracket.

Related Art

JP 2016-203772 A discloses a holding device for attaching an in-vehicle camera, which takes an image outside a vehicle through a window glass of an automobile, to the window glass.

This holding device includes a first bracket which is attached to the in-vehicle camera and a second bracket which is attached to the window glass. Then, the first bracket attached to the in-vehicle camera is slid in a direction along the inner surface of the window glass while the second bracket is attached to the window glass so that both brackets are fitted to each other and the in-vehicle camera is held inside the window glass. Accordingly, the holding device of Patent Document 1 does not apply an outward pressing force to the window glass when installing the in-vehicle camera on the window glass. This is effective in that a particular attention is not required when performing an attachment operation before an adhesive is cured in a case in which a window glass is installed in an opening portion from the outside of a vehicle body and is fixed to the vehicle body by adhering.

On the other hand, the holding device of the Patent Document 1 combines the first bracket with the second bracket by the slide-fitting. Although it is necessary to improve the dimensional accuracy of both brackets in order to fit both brackets without rattling, there is a limitation in design. Particularly when both brackets are formed as plastic molded products, it is more difficult to secure high dimensional accuracy as the bracket increases in size. Further, an insertion force when the first bracket is inserted to the second bracket tends to increase as the rattling is securely suppressed, which is not desirable from the viewpoint of smoothly attaching the in-vehicle camera.

Patent Document 1: Japanese Patent Publication 2016-203772.

SUMMARY OF THE INVENTION

A main object achieved by the present invention is to appropriately hold an in-vehicle device so as not to need fitting without rattling by setting a state in which the in-vehicle device is temporarily installed using such a bracket first attached to a window glass without applying an upward pressing force to the window glass and pressing a later-described locking member against a later-described supported portion of the in-vehicle device in terms of a subsequent operation of the locking member.

In order to achieve the above-described object, from a first aspect, a bracket according to the present invention is a bracket for holding an in-vehicle device inside a window glass including: a base which is fixed to a vehicle inside surface of the window glass; right and left side portions which protrude downward from the base; and a locking member that is assembled so as to be movable between a first position and a second position, in which at least one support portion is formed so as to receive a supported portion provided in the in-vehicle device and inserted between the right and left side portions from a lateral direction while the locking member is located at the first position. When the locking member is moved to the second position while the supported portion is received by the support portion, the locking member is pressed against the supported portion so that the in-vehicle device is held in both or any one of the front to rear direction and the up to down direction without rattling.

According to such a configuration, first, the in-vehicle device can be temporarily installed in a space formed by the right and left side portions and the base in the bracket fixed to the window glass by inserting the supported portion into the support portion from the lateral direction without applying an upward pressing force to the window glass. Then, secondly, the in-vehicle camera which is the in-vehicle device can be permanently installed by moving the locking member to the second position from this temporary installation state without applying an upward pressing force to the window glass.

According to another aspect of the present invention, the locking member rotatably combines a base portion with the side portion, a free end of the locking member is located outside the side portion when the locking member is located at the first position, and the free end is located behind the supported portion received by the support portion when the locking member is located at the second position.

Further, according to a further aspect of the present invention, the locking member includes a first part which is pressed against a portion protruding from an outer surface of the side portion in the supported portion received by the support portion from below and a second part which is pressed against the supported portion from the rear side at the second position.

Further, according to a further aspect of the present invention, the side portion is provided with an engaged portion which engages with an engagement portion of the locking member at the second position so as to maintain a state in which the locking member is located at the second position.

Further, according to a further aspect of the present invention, both of the right and left side portions are provided with the locking member.

Further, in order to achieve the above-described object, an in-vehicle device holding device according to the present invention is an in-vehicle device holding device including the bracket; and a cover which is combined with the bracket by fitting, in which a blocking portion is provided inside the cover so as to prohibit the movement of the locking member at the second position toward the first position in the combined state.

According to the present invention, it is possible to appropriately hold the in-vehicle device so as not to need fitting without rattling by setting a state in which the in-vehicle device is temporarily installed using the support portion of the bracket first attached to the window glass without applying an upward pressing force to the window glass and pressing the later-described locking member against the supported portion of the in-vehicle device in terms of the subsequent operation of the locking member.

DETAILED DESCRIPTION OF THE INVENTION

Hereinafter, a typical embodiment of the present invention will be described with reference to FIGS. 1 to 16.

A bracket 3 according to the embodiment is one for attaching an in-vehicle device such as an in-vehicle camera 2, which takes an image outside a vehicle through a window glass of the vehicle, to the window glass. Typically, such a bracket 3 is used to attach the in-vehicle camera 2, which takes an image outside the vehicle through a front window 1 of an automobile, to the front window 1. Additionally, the concept of the in-vehicle camera 2 in the present specification includes not only cameras in a narrow sense but also known devices such as sensors that receive optical information.

Figure 6:
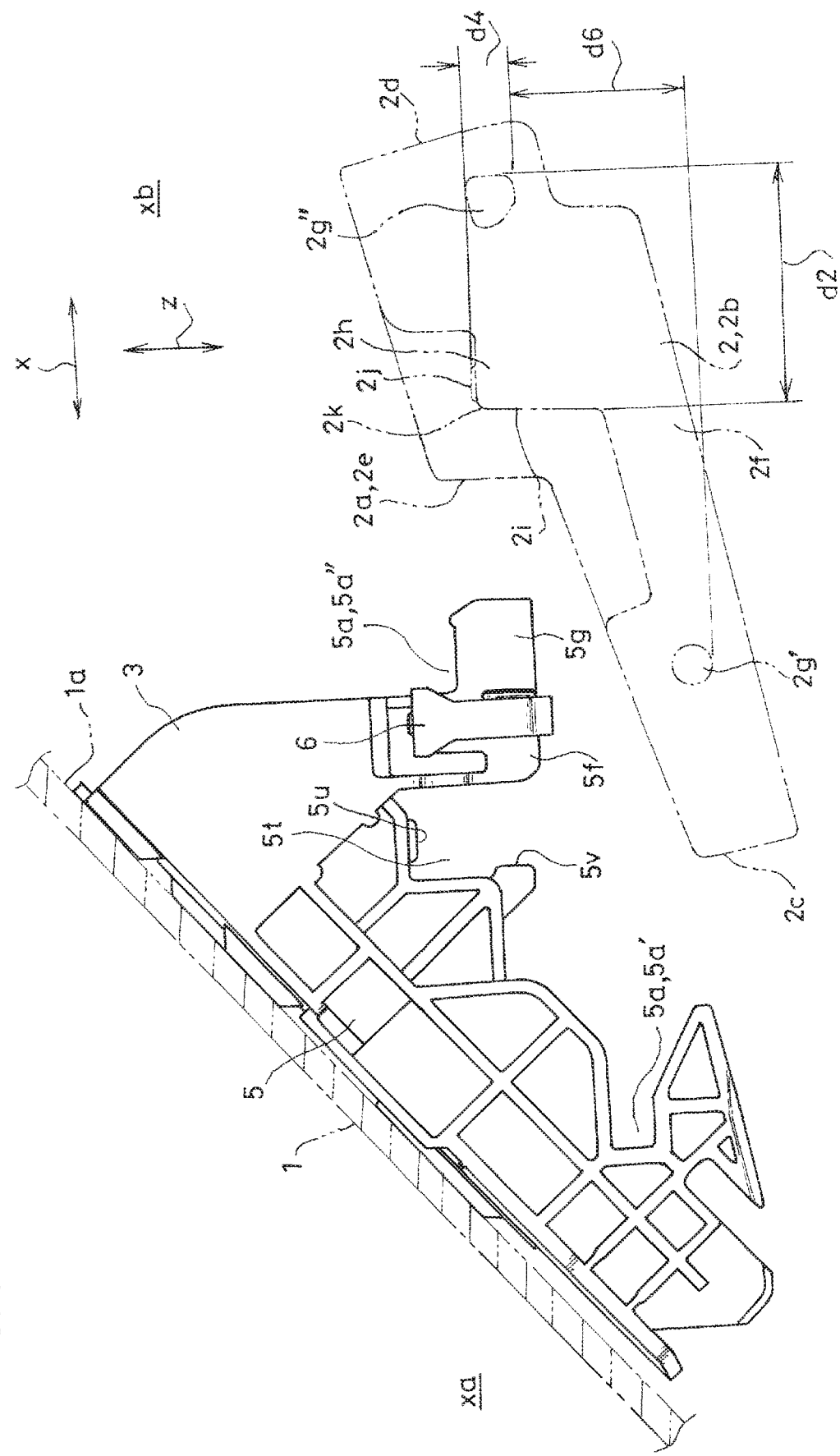
FIG. 6 is a side view in which the state of FIG. 2 is viewed from a lateral side and an imaginary line shows the camera body of the in-vehicle camera.
Figure 7:
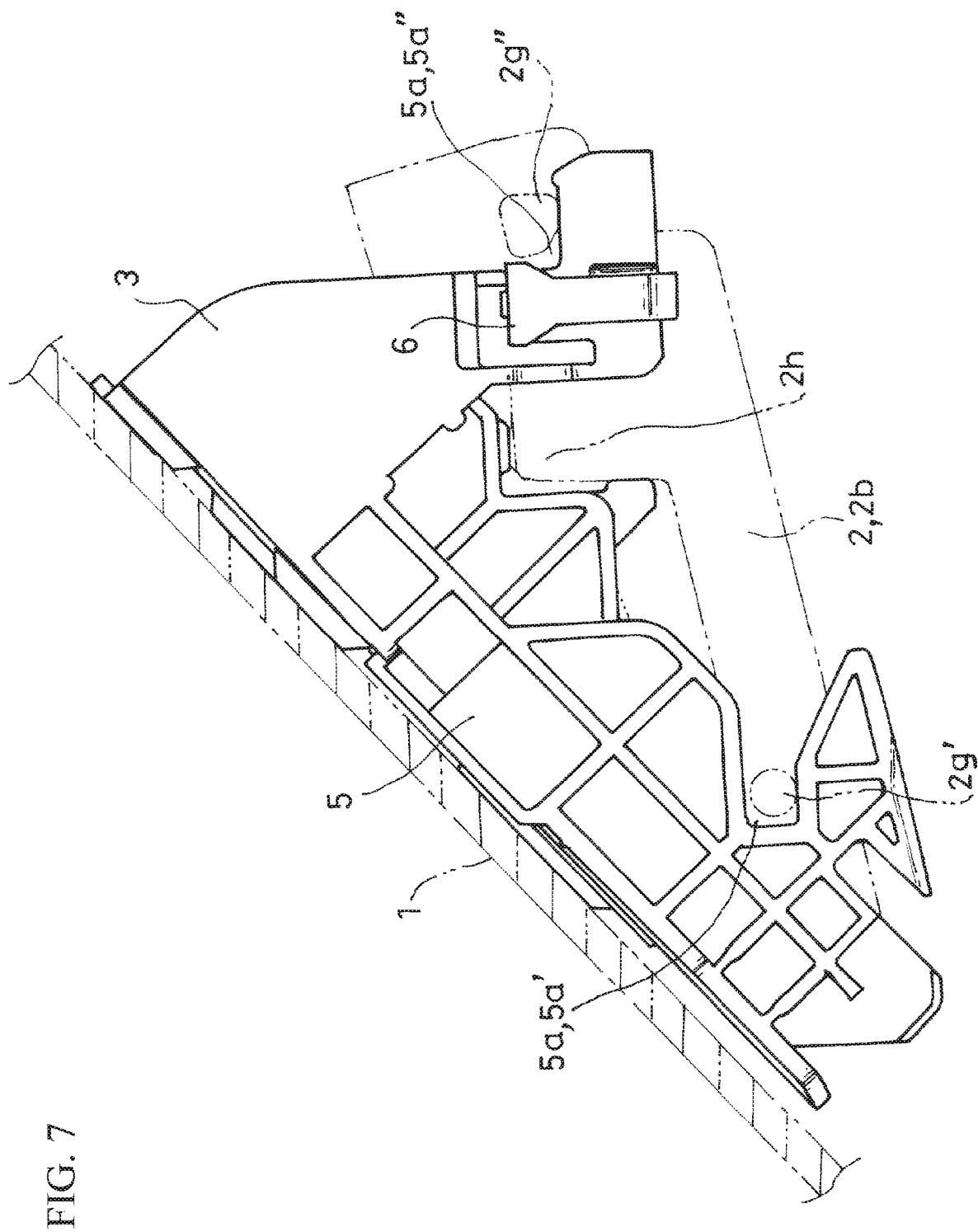
FIG. 7 is a side view in which the camera body of the in-vehicle camera temporarily installed in the bracket is viewed from a lateral side and an imaginary line shows the camera body of the in-vehicle camera.
Figure 8:
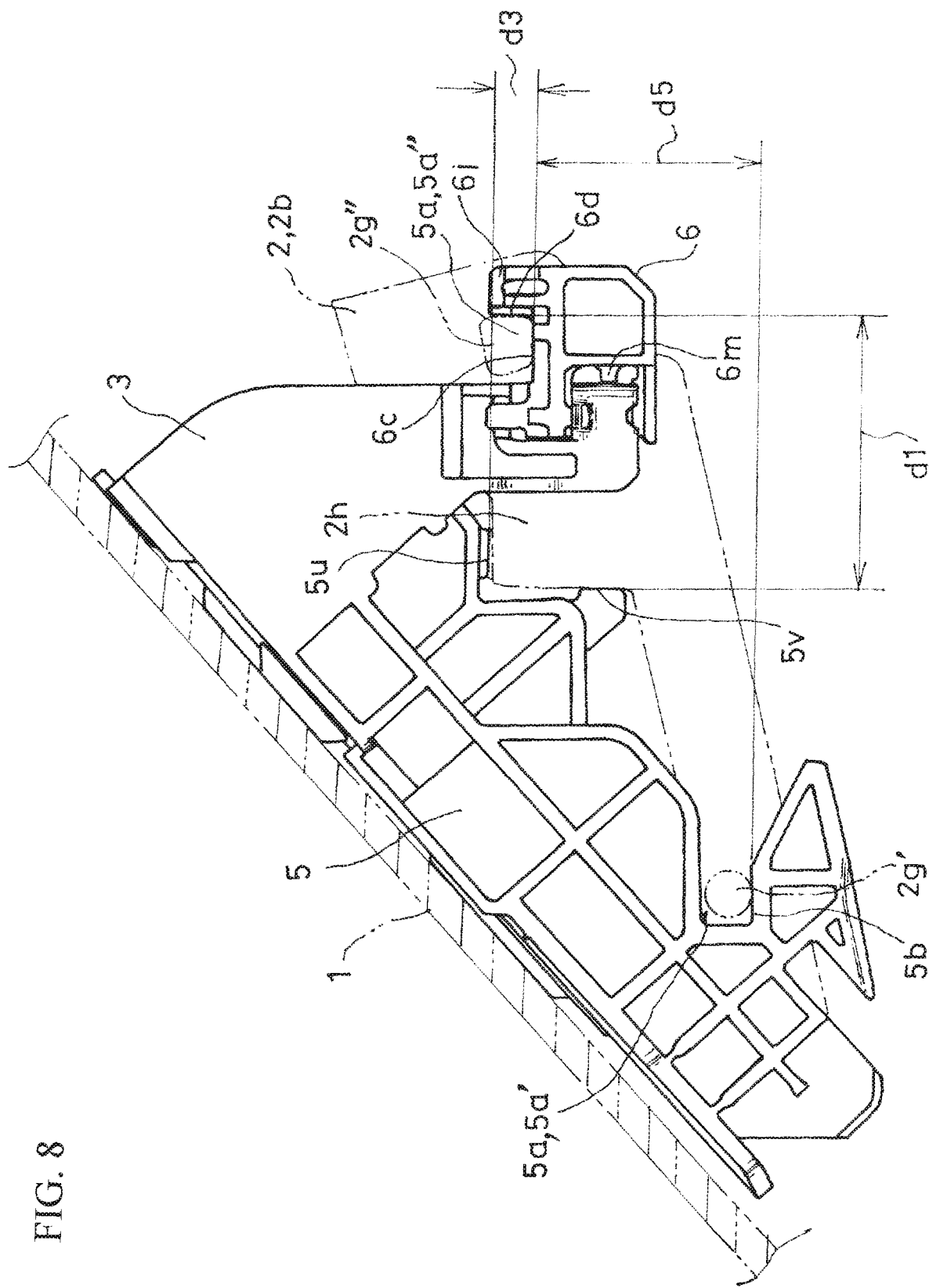
FIG. 8 is a side view in which the state of FIG. 4 is viewed from a lateral side and an imaginary line shows the in-vehicle camera.

In FIGS. 6 to 8, reference numeral 1 denotes a front window, reference numeral 3 denotes a bracket, and reference numeral 2b denotes a camera body of the in-vehicle camera 2. The front to rear direction of the vehicle is denoted by reference numeral x in FIGS. 1 and 6, the front side of the vehicle is denoted by reference numeral xa in FIG. 6, and the rear side of the vehicle is denoted by reference numeral xb in FIG. 6. Further, the left to right direction of the vehicle is denoted by reference numeral y in FIG. 1 and the up to down direction is denoted by reference numeral z in FIGS. 1 and 6.

The front window 1 has a slope inclined toward the front side xa of the vehicle. The bracket 3 is fixed to a vehicle inside surface 1a of the front window 1.

In this embodiment, the in-vehicle camera 2 can be temporarily placed on the bracket 3 by laterally moving the in-vehicle camera 2 with respect to the bracket 3 to a predetermined position in a direction from the rear side xb of the vehicle toward the front side xa of the vehicle from a state in which the bracket 3 is fixed to the front window 1. Then, a locking member 6 to be described later is moved from this temporarily placed state so that the in-vehicle camera 2 is held by the bracket 3 in the front to rear direction and the up to down direction without rattling.

In the example illustrated in the drawing, the in-vehicle camera 2 is attached to the front window 1 through the bracket 3 so that a light incident portion 2a for taking an image faces the front side xa of the vehicle.

In the example illustrated in the drawing, the camera body 2b of the in-vehicle camera 2 includes a step 2e which is provided between a front end portion 2c and a rear end portion 2d so as to face the front side xa of the vehicle and the step 2e is provided with the light incident portion 2a. In the camera body 2b, the dimension in the up to down direction z is set to be small between the front end portion 2c and the step 2e and the dimension in the up to down direction z is set to be large between the step 2e and the rear end portion 2d.

Each of right and left side portions 2f of the camera body 2b is provided with a supported portion 2g which is supported by a support portion 5a of the bracket 3 to be described later. The supported portion 2g is provided at two positions in each of the right and left side portions 2f of the camera body 2b at an interval in the front to rear direction. Each of the supported portions 2g at two positions has a protrusion shape that protrudes from the side portion 2f of the camera body 2b. A front supported portion 2g' has a columnar shape in which a cross-section in a direction orthogonal to the protruding direction is substantially circular. A rear supported portion 2g" has a pentagonal columnar shape in which a cross-section orthogonal to the protruding direction is substantially pentagonal.

Further, in the example illustrated in the drawing, a received portion 2h is formed between the front supported portion 2g' and the rear supported portion 2g" in each of the right and left side portions 2f of the camera body 2b so as to be received in a receiving portion 5t formed in a middle part 5s of the side portion 5 of the bracket 3 from the rear side. This received portion 2h includes a longitudinal front abutted portion 2i which is formed forward and a horizontal upper abutted portion 2j which is continuously formed backward from the upper end of the front abutted portion 2i so as to form a right angle corner 2k between the upper end thereof and the lateral upper abutted portion (see FIG. 6).

The bracket 3 includes a base 4 which is fixed to the vehicle inside surface 1a of the front window 1, right and left side portions 5 which protrude downward from the base 4, and the locking member 6 that is assembled to at least one of the side portions 5 so as to be movable between a first position and a second position.

Further, the side portion 5 is provided with at least one support portion 5a which receives the supported portion 2g provided in the camera body 2b of the in-vehicle camera 2 which is the in-vehicle device and is inserted between the right and left side portions 5 from the lateral direction while the locking member 6 is located at the first position.

In the example illustrated in the drawing, the base 4 has a quadrangular outline including a front side 4a, a rear side 4b, a left side 4c, and a right side 4d. The upper surface of the base 4 is fixed to the vehicle inside surface 1a of the front window 1 by adhering or the like. Since the front window 1 has a slope inclined forward, the base 4 is also inclined according to the slope in the fixed state so that the rear side 4b is located above the front side 4a. Reference numeral 4e in FIG. 1 denotes a light guide hole formed in the base 4 corresponding to the light incident portion 2a of the camera body 2b.

The left side portion 5 is formed so as to protrude downward from the left side 4c of the base 4 and the right side portion 5 is formed so as to protrude downward from the right side 4d of the base 4.

The camera body 2b of the in-vehicle camera 2 is received between the right and left side portions 5. Specifically, the in-vehicle camera 2 is attached to the front window 1 through the bracket 3 while the upper surface of the camera body 2b is brought into contact with the lower surface of the base 4 of the bracket 3, the left side portion 2f of the camera body 2b is brought into contact with the inner surface of the left side portion 5 of the bracket 3, and the right side portion 2f of the camera body 2b is brought into contact with the inner surface of the right side portion 5 of the bracket 3.

The dimension of the camera body 2b in the left to right direction is wide at the formation position of the front supported portion 2g' and is narrow at the formation position of the rear supported portion 2g". Accordingly, the side portion 5 of the bracket 3 includes a front part 5q which is located at the front side of the bracket 3 so as to widen the distance between the right and left side portions 5 and a rear part 5r which is located at the rear side of the bracket 3 so as to narrow the distance between the right and left side portions 5.

Additionally, since the left side portion 5 has a shape symmetrical to the right side portion 5 (line symmetry based on a virtual longitudinal centerline of bracket 3) when the bracket 3 is viewed from the front side of the base 4, the structure of the right side portion 5 will be described below and the description of the structure of the left side portion 5 will be omitted.

In the example illustrated in the drawing, the support portion 5a is formed in each of the front part 5q and the rear part 5r constituting the side portion 5.

The support portion 5a (hereinafter, referred to as a front support portion 5a') of the front part 5q has a groove shape that divides the front part 5q into upper and lower parts. The front support portion 5a' includes a lower groove wall 5b and an upper groove wall 5c which are oriented laterally while the bracket 3 is fixed to the front window 1 and is used to close the groove front end 5d and open the groove rear end 5e (see FIG. 9). The distance between the lower groove wall 5b and the upper groove wall 5c is slightly larger than the thickness of the front support portion 5a of the camera body 2b. The lower groove wall 5b inclines at an area between a substantially center position of the entire length and the groove rear end 5e so that a distance between the lower groove wall 5b and the upper groove wall 5c gradually increases as it goes toward the groove rear end.

The support portion 5a (hereinafter, referred to as a rear support portion 5a") of the rear part 5r is formed in a shape including a columnar portion 5f which is suspended longitudinally from the base 4 and an arm plate portion 5g which protrudes backward from the lower end portion of the columnar portion 5f. Although the inner surface of the columnar portion 5f and the inner surface of the arm plate portion 5g are located on the same surface, the outer surface of the arm plate portion 5g in relation to the outer surface of the columnar portion 5f is located at the inside and a step 50 (see FIG. 9) corresponding to the thickness of the locking member 6 to be described later is formed between both outer surfaces. In a state in which the bracket 3 is fixed to the front window 1, the upper side 5h of the arm plate portion 5g is oriented laterally. A temporary holding protrusion 5j which protrudes upward is formed in a corner portion in which the upper side 5h and the rear side 5i of the arm plate portion 5g are in contact with each other.

In the example illustrated in the drawing, the middle part 5s of the bracket 3 is formed between the front part 5q and the rear part 5r of the side portion 5 of the bracket 3. The middle part 5s of the bracket 3 includes an upper abutting portion 5u which is oriented laterally and a front abutting portion 5v which is oriented longitudinally while the bracket 3 is fixed to the front window 1 and includes the receiving portion 5t of the received portion 2h formed in the side portion 5 of the camera body 2b opening backward and downward.

Accordingly, in this embodiment, as described above, the camera body 2b of the in-vehicle camera 2 which is the in-vehicle device can be inserted and temporarily placed between the right and left side portions 5 of the bracket 3 below the base 4 of the bracket 3 while the locking member 6 is located at the first position from a state in which the bracket 3 is fixed to the front window 1 (Figures from FIG. 6).

(1) In each of the right and left sides of the camera body 2b, the front supported portion 2g' of the camera body 2b is introduced into the front support portion 5a' of the side portion 5 of the bracket 3 from the rear side so as to reach the groove front end 5d of the front support portion 5a'. This introduction is facilitated by the slope of the lower groove wall 5b.

(2) In each of the right and left sides of the camera body 2b, the received portion 2h of the camera body 2b is received into the receiving portion 5t of the bracket 3 from the rear side so that the front abutted portion 2i of the received portion 2h abuts against the front abutting portion 5v of the receiving portion 5t from the rear side and the upper abutted portion 2j of the received portion 2h abuts against the upper abutting portion 5u of the receiving portion 5t from below.

(3) In each of the right and left sides of the camera body 2b, the rear supported portion 2g" of the camera body 2b is introduced from the rear side so as to be located between the columnar portion 5f and the temporary holding protrusion 5j on the arm plate portion 5g of the rear support portion 5a of the side portion 5 of the bracket 3.

Then, in this embodiment, when the locking member 6 is moved to the second position while the supported portion 2g is received by the support portion 5a, the locking member is pressed against the supported portion 2g so that the in-vehicle device is held in the front to rear direction and the up to down direction without rattling.

Accordingly, in this embodiment, first, the in-vehicle camera 2 which is the in-vehicle device can be temporarily installed in a space formed by the right and left side portions 5 and the base 4 in the bracket 3 fixed to the window glass by inserting the supported portion 2g into the support portion 5a from the lateral direction without applying an upward pressing force to the window glass. Then, secondly, the in-vehicle camera 2 which is the in-vehicle device can be permanently installed by moving the locking member 6 to the second position from this temporary installation state without applying an upward pressing force to the window glass.

The locking member 6 is combined with the side portion 5 by rotatably combining a base portion 6a with the side portion 5 of the bracket 3.

Figure 1:
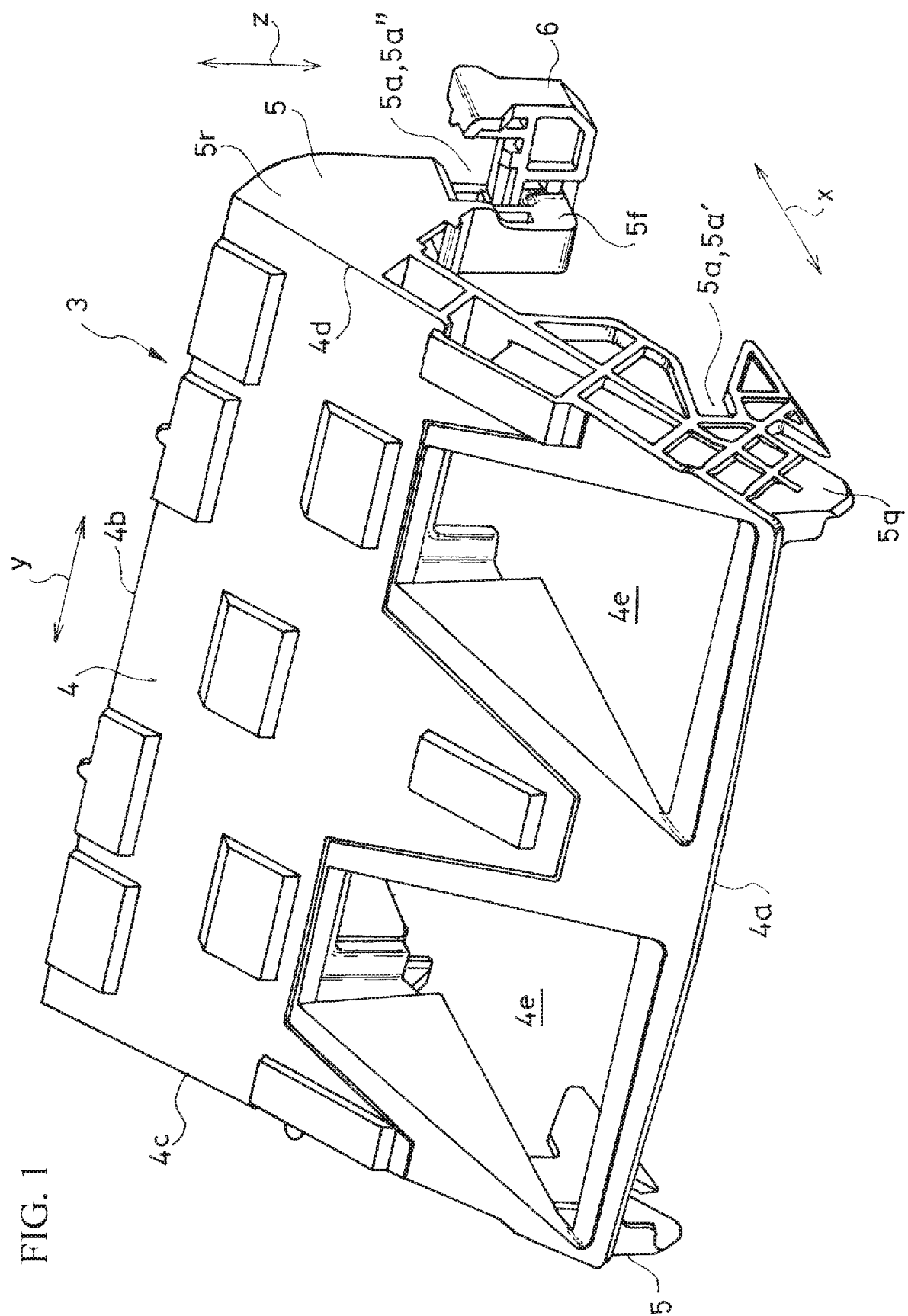
FIG. 1 is a perspective view in which a bracket according to an embodiment of the present invention is viewed from a front side.
Figure 2:
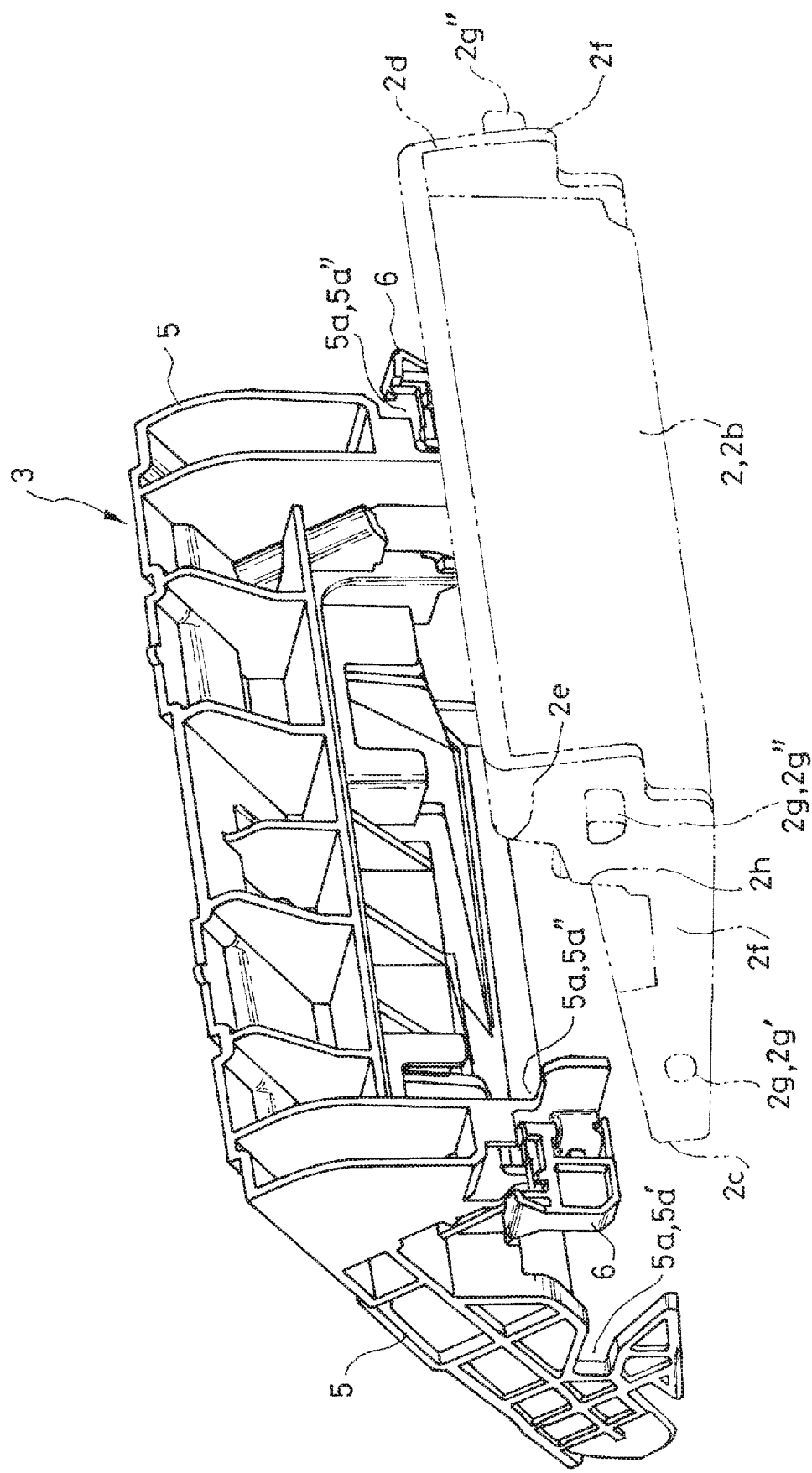
FIG. 2 is a perspective view in which the bracket is viewed from a rear side wherein an imaginary line shows a camera body of an in-vehicle camera immediately before the in-vehicle camera is assembled.
Figure 3:
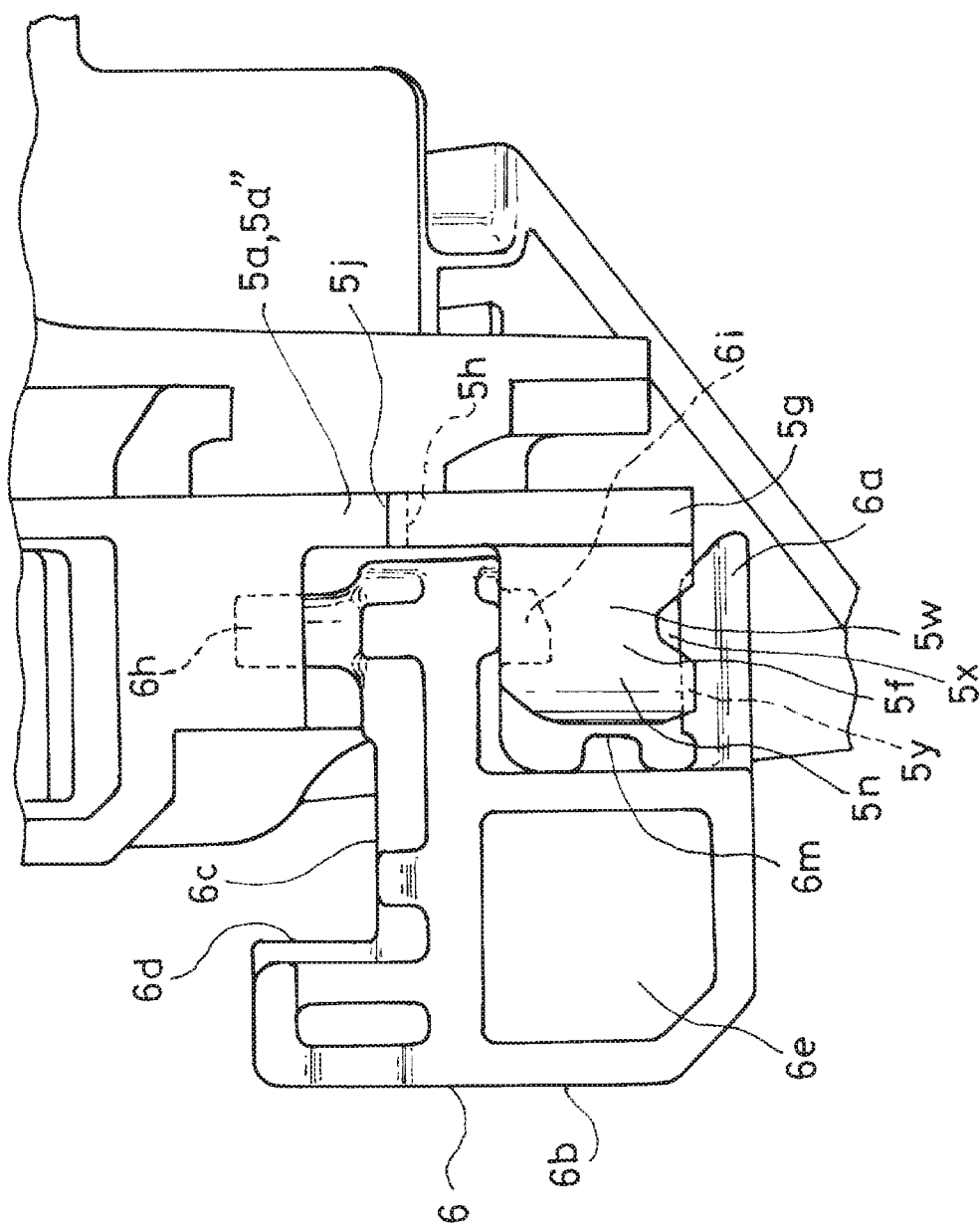
FIG. 3 is an enlarged view of a main part of the bracket, illustrating the main part from a rear side.
Figure 4:
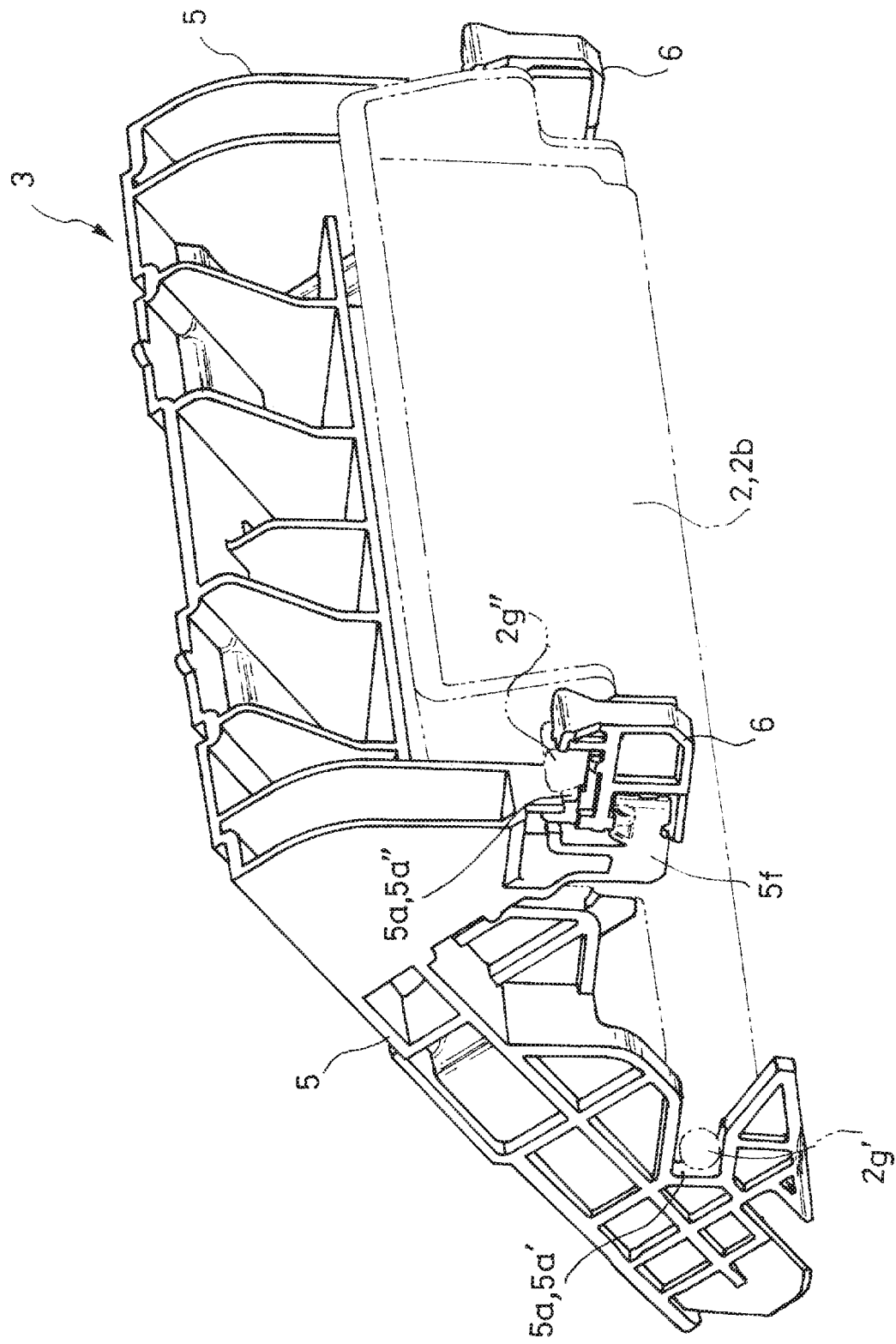
FIG. 4 is a perspective view in which the bracket is viewed from a rear side and an imaginary line shows the camera body of the in-vehicle camera when the in-vehicle camera is permanently installed in the bracket.
Figure 5:
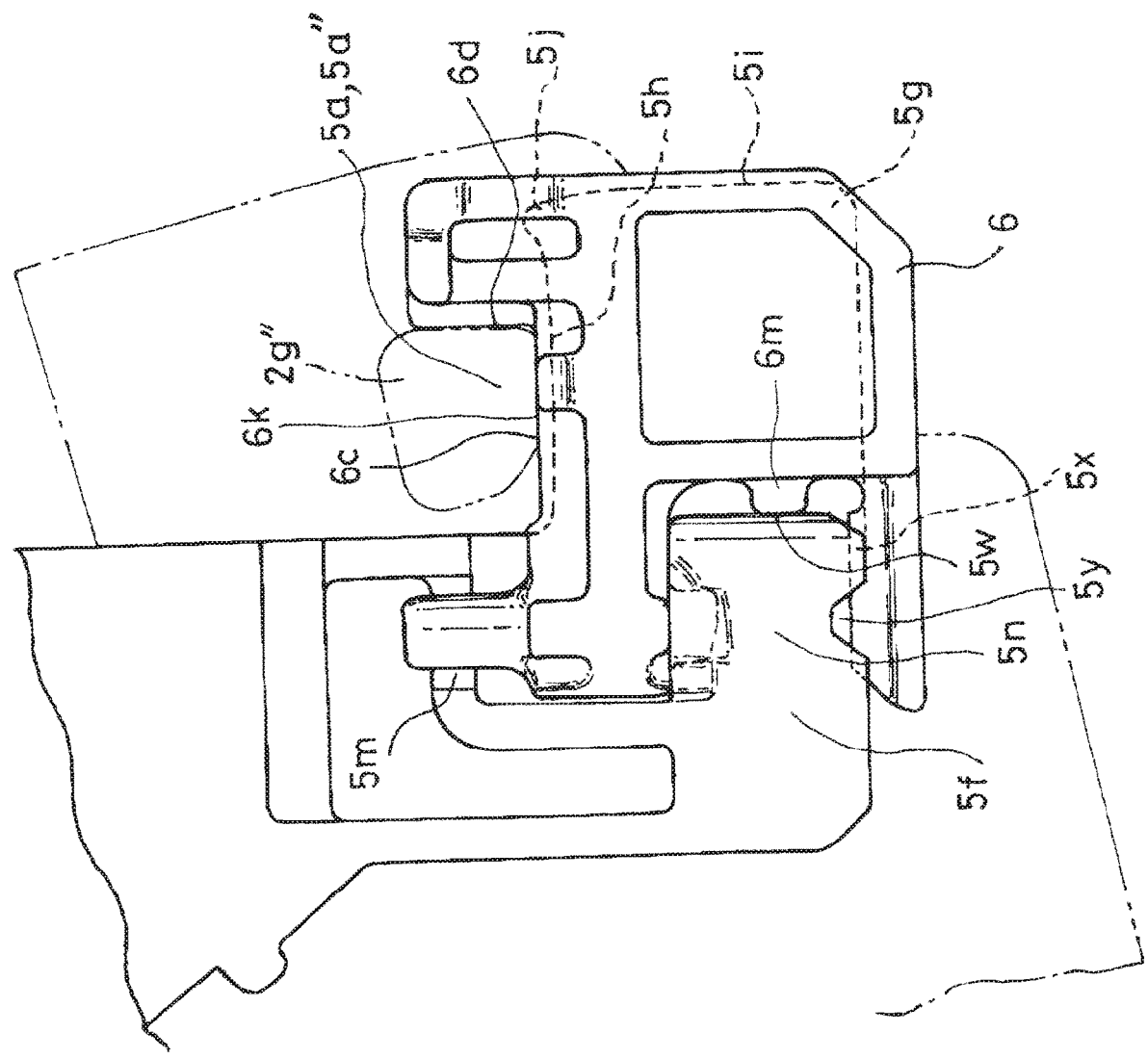
FIG. 5 is an enlarged view of a main part of the bracket, illustrating the main part from a lateral side.

Specifically, the locking member 6 allows the free end 6b to be located at the outside of the side portion 5 of the bracket 3 at the first position (FIGS. 1, 2, 3, 6, and 7) and allows the free end 6b to be located behind the supported portion 2g received by the support portion 5a at the second position (FIGS. 4, 5, and 8).

Further, the locking member 6 includes a first part 6c which is pressed against a portion protruding from the outer surface of the side portion 5 of the bracket 3 in the supported portion 2g received by the support portion 5a from below and a second part 6d which is pressed against the supported portion 2g from the rear side at the second position.

In this embodiment, the locking member 6 is provided only in the rear part 5r in each of the right and left side portions 5 of the bracket 3.

Further, in the locking member 6, the base portion 6a is rotatably combined with the columnar portion 5f constituting the rear part 5r.

In the example illustrated in the drawing, the locking member 6 includes a plate-shaped main portion 6e which abuts against one surface of an outer surface 5k of the arm plate portion 5g of the rear part 5r at the second position, an upper arm portion 6f and a lower arm portion 6g which protrude forward from the front part of the plate-shaped main portion 6e, and an upper shaft portion 6h and a lower shaft portion 6i which protrude upward from the front end of the upper arm portion 6f and the upper arm portion 6f, the lower arm portion 6g, the upper shaft portion 6h, and the lower shaft portion 6i constitute the base portion 6a. Further, the rear end of the plate-shaped main portion 6e, that is, the free end 6b is provided with a tightening protrusion portion 6j which is the second part 6d protruding upward from the free end 6b. In a state in which the locking member 6 is located at the second position, the front part of the tightening protrusion portion 6j is located at the front side of the front part of the temporary holding protrusion 5j and when the locking member 6 is rotated to the second position, the locking member is pressed to the rear side of the rear supported portion 2g" and serves as the second part 6d (FIG. 5). Further, an upper portion 6k of the plate-shaped main portion 6e of the locking member 6 is located at a level slightly higher than the upper side 5h of the arm plate portion 5g constituting the support portion 5a of the rear part 5r and when the locking member 6 is rotated to the second position, the locking member is pressed to the lower side of the rear supported portion 2g" and serves as the first part 6c (see FIG. 5).

Figure 9:
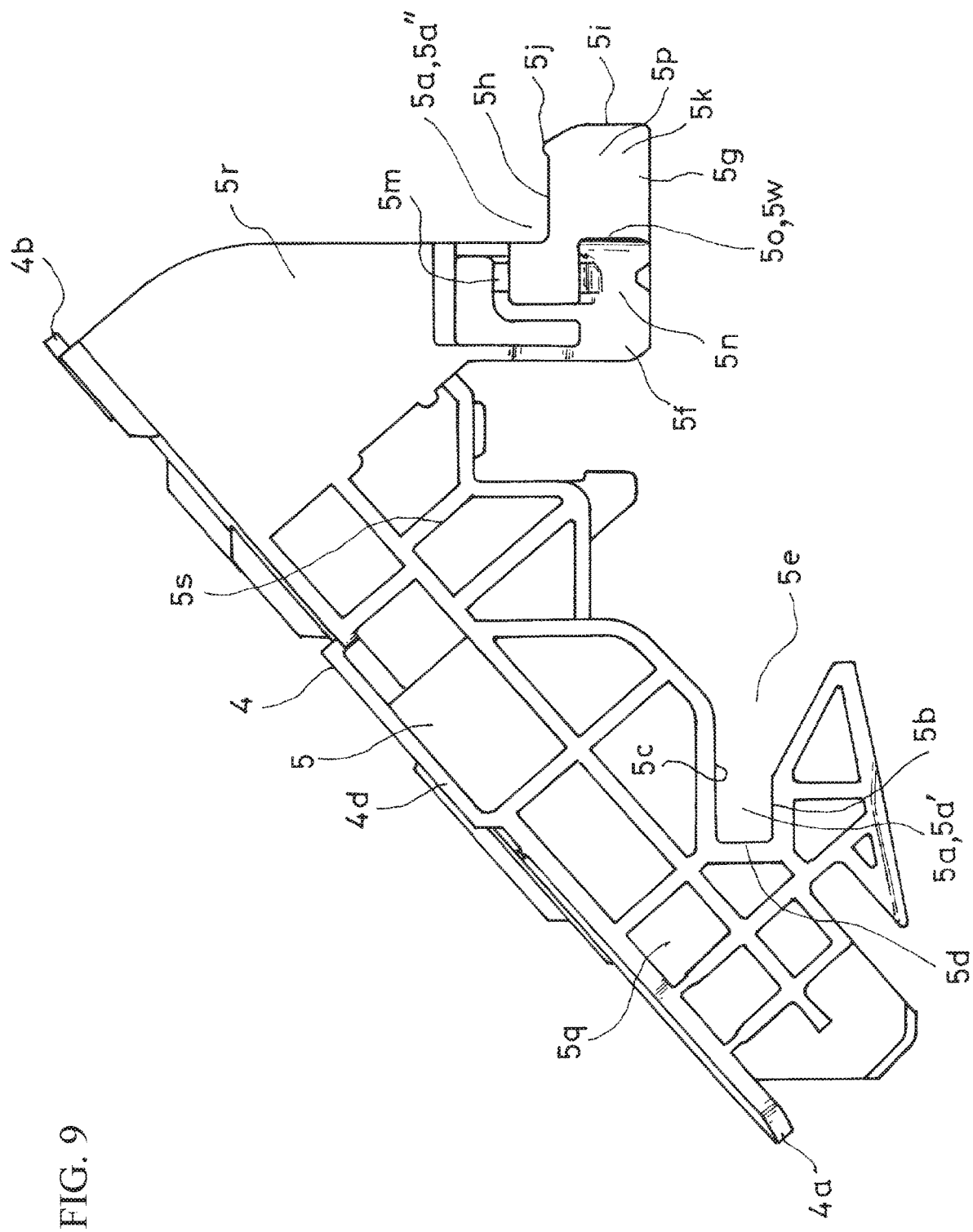
FIG. 9 is a side view of the bracket while a locking member is separated.
Figure 10:
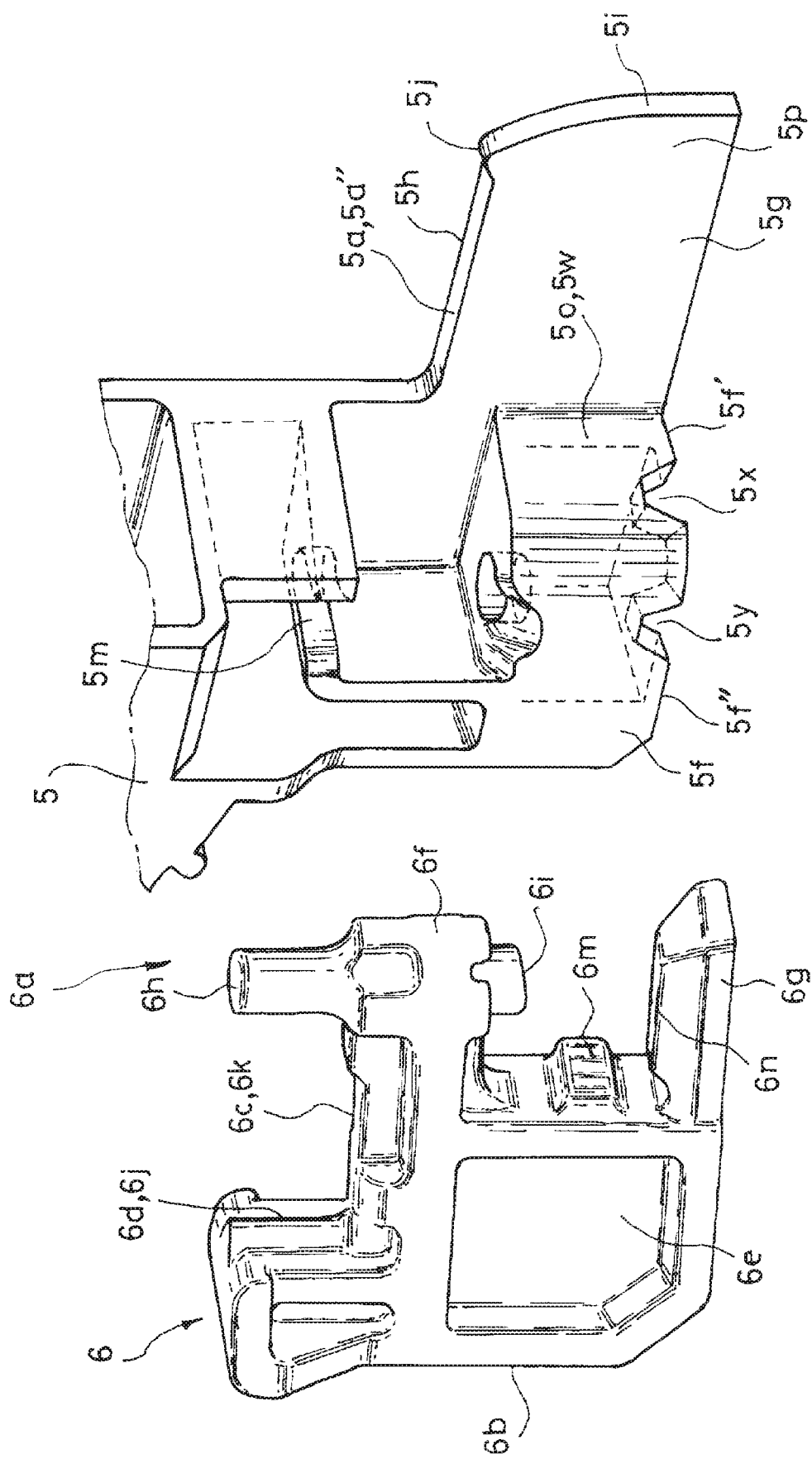
FIG. 10 is a perspective view of a main part of the bracket and the locking member.
Figure 11:
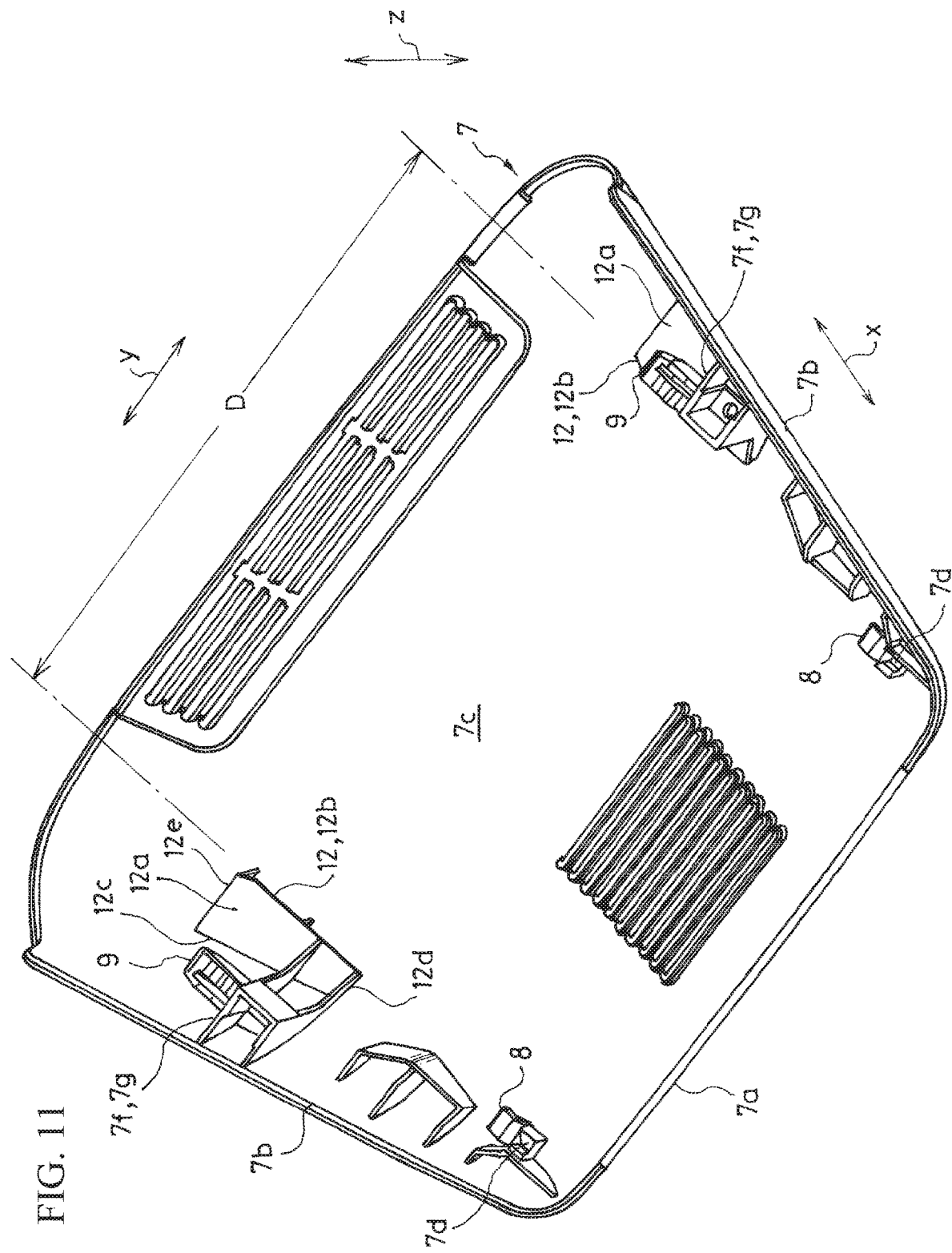
FIG. 11 is a perspective view in which a cover constituting a holding device according to the embodiment of the present invention is viewed from above.
Figure 12:
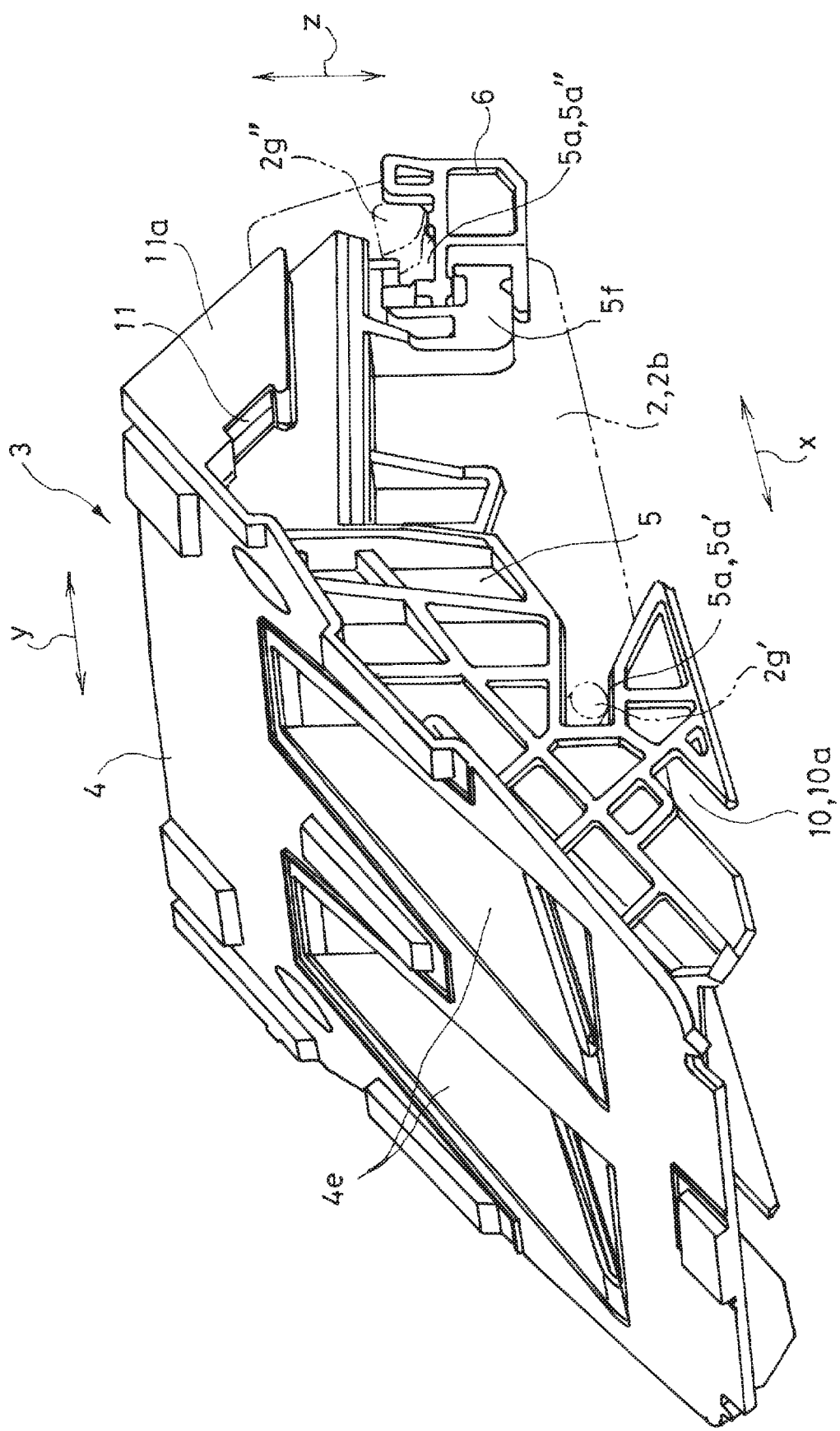
FIG. 12 is a perspective view in which a bracket constituting the holding device is viewed from a front side and an imaginary line shows the camera body of the in-vehicle camera when the in-vehicle camera is permanently installed in the bracket.
Figure 13:
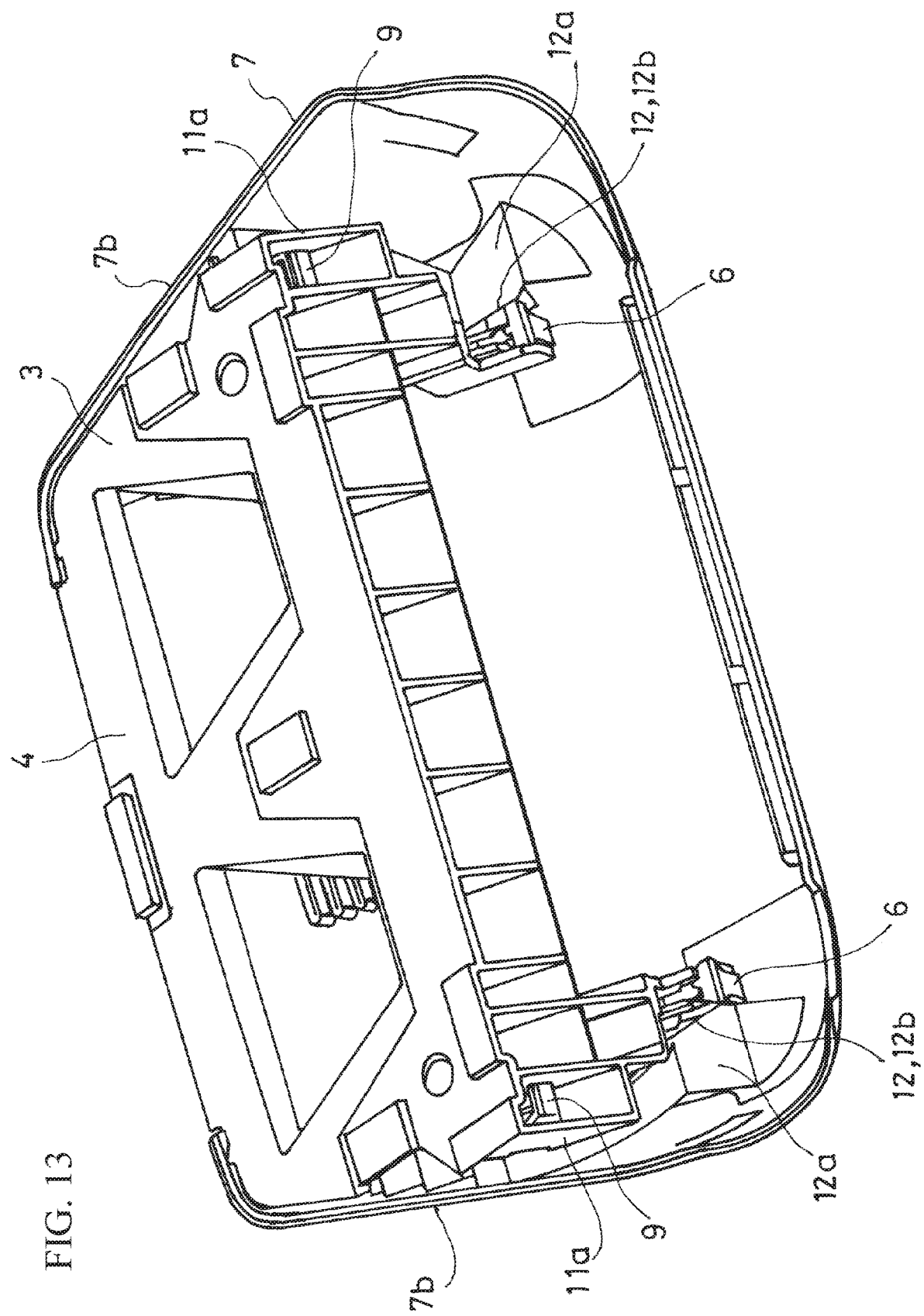
FIG. 13 is a perspective view in which the cover constituting the holding device combined with the bracket constituting the holding device is viewed from a rear side and the description of the in-vehicle camera is omitted.
Figure 14:
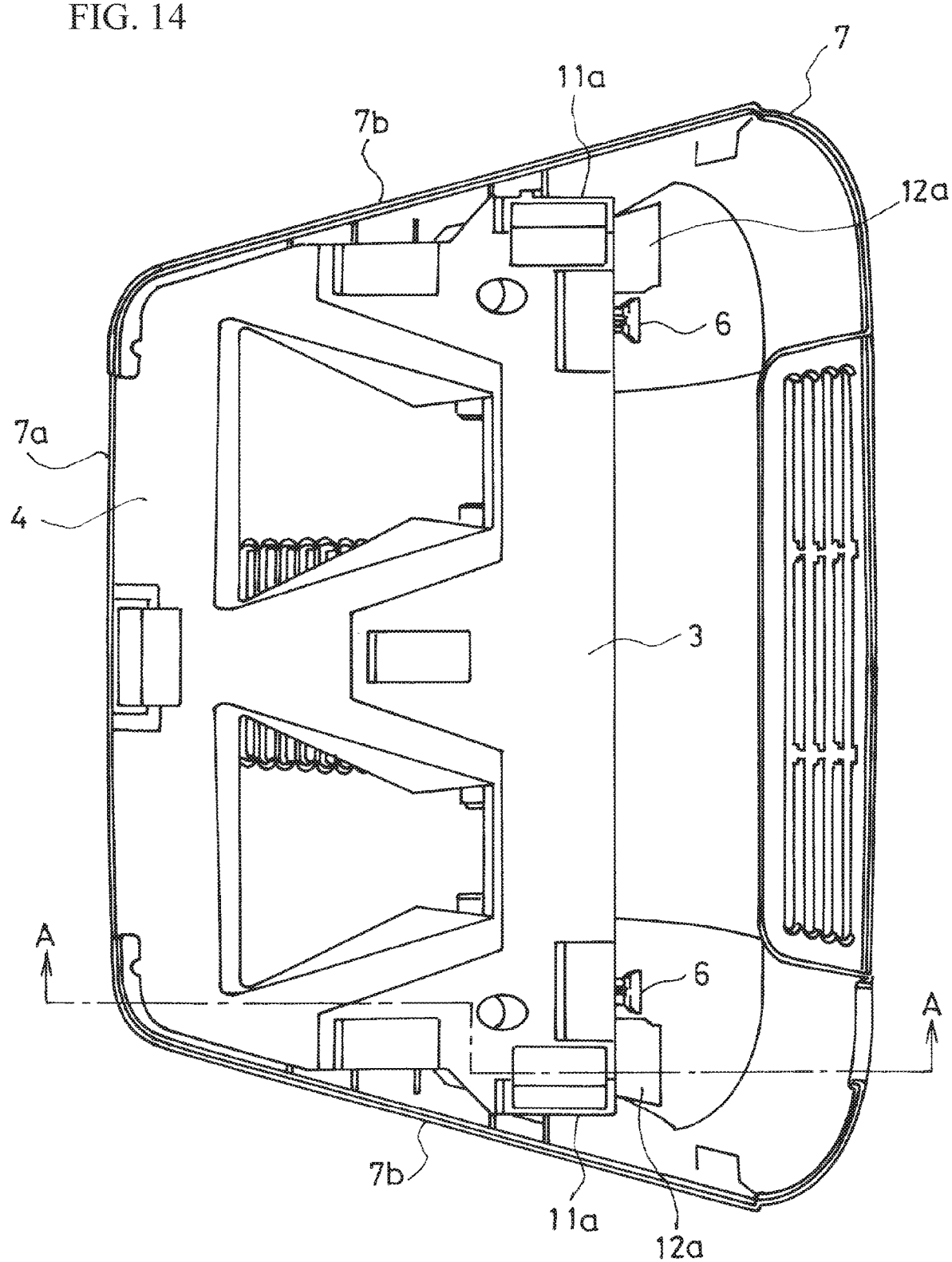
FIG. 14 is a plan view illustrating a state in which the cover constituting the holding device is combined with the bracket constituting the holding device wherein the in-vehicle camera is omitted.

The outer surface of the columnar portion 5f of the rear part 5r is provided with a bearing recess portion 5m which rotatably receives the upper shaft portion 6h of the locking member 6 (see FIG. 9). Further, a portion located below the bearing recess portion 5m in the columnar portion 5f enters between the upper arm portion 6f and the lower arm portion 6g to be a rotation regulation portion 5n which regulates the rotation of the locking member 6 in the range of about 90°. The lower shaft portion 6i is rotatably received in the upper portion of the rotation regulation portion 5n (see FIG. 5).

Accordingly, in the example illustrated in the drawing, the locking member 6 is provided in the side portion 5 of the bracket 3 so as to be rotatable between the first position in which the plate surface of the plate-shaped main portion 6e is substantially orthogonal to the outer surface of the side portion 5 and a second position in which the plate surface of the plate-shaped main portion 6e is substantially parallel to the outer surface of the side portion 5. In the example illustrated in the drawing, the locking member 6 is formed so that the rotation axis substantially follows the up to down direction.

In a state in which the locking member 6 is located at the first position, the supported portion 2g of the camera body 2b is introduced from the rear side to be placed on the support portion 5a of the rear part 5r. On the other hand, when the locking member 6 is rotated to the second position from the temporary installation state, the tightening protrusion portion 6j which is the second part 6d is located at the rear side of the supported portion 2g and the tightening protrusion portion 6j which is the second part 6d and the upper portion 6k of the plate-shaped main portion 6e which is the first part 6c corresponding to a part of the locking member 6 are pressed against the supported portion 2g. Accordingly, it is possible to shift to the permanent installation state in which the in-vehicle camera 2 is held in the front to rear direction and the up to down direction without rattling by sandwiching the camera body 2b between the locking member 6 and a part contacting the camera body 2b of the in-vehicle camera 2 in the side portion 5 of the bracket 3.

Specifically, in the example illustrated in the drawing, the rattling of the in-vehicle camera 2 in the front to rear direction is suppressed in such a manner that a distance d1 (see FIG. 8) between the front abutting portion 5v of the receiving portion 5t of the middle part 5s of the bracket 3 of the bracket 3 and the tightening protrusion portion 6j of the locking member 6 at the second position substantially matches a distance d2 (see FIG. 6) between the front abutted portion 2i of the received portion 2h of the in-vehicle camera 2 and the rear end of the rear supported portion 2g" of the in-vehicle camera 2.

Further, the rattling of the in-vehicle camera 2 in the up to down direction is suppressed in such a manner that a distance d3 (see FIG. 8) between the upper abutting portion 5u of the receiving portion 5t of the middle part 5s of the bracket 3 of the bracket 3 and the upper portion 6k of the plate-shaped main portion 6e of the locking member 6 located at the second position substantially matches a distance d4 (see FIG. 6) between the upper abutted portion 2j of the received portion 2h of the in-vehicle camera 2 and the lower end of the rear supported portion 2g" of the in-vehicle camera 2 and a distance d5 (see FIG. 8) between the lower groove wall 5b of the front support portion 5a' of the bracket 3 and the upper portion 6k of the plate-shaped main portion 6e of the locking member 6 located at the second position substantially matches a distance d6 (see FIG. 6) between the lower end of the front supported portion 2g' of the in-vehicle camera 2 and the lower end of the rear supported portion 2g" of the in-vehicle camera 2.

Further, in this embodiment, the side portion 5 of the bracket 3 is provided with a protruding engaged portion 5w which is pressed against the protruding engaging portion 6m of the locking member 6 at the second position.

In the example illustrated in the drawing, a protrusion-shaped protruding engaging portion 6m which does not come into contact with the columnar portion 5f of the rear support portion 5a in the bracket 3 at the first position (see FIG. 3), but comes into press-contact with the columnar portion 5f at the second position (see FIG. 5) is provided at a portion located between the upper arm portion 6f and the lower arm portion 6g of the plate-shaped base portion 6a of the locking member 6.

Further, in this embodiment, the side portion 5 of the bracket 3 is provided with an engaged portion 5x which engages with an engagement portion 6n of the locking member 6 at the second position so as to maintain a state in which the locking member 6 is located at the second position.

In the example illustrated in the drawing, the engagement portion 6n is formed by the upper portion of the lower arm portion 6g of the locking member 6. The lower end of the columnar portion 5f of the side portion 5 of the bracket 3 is provided with an engaged portion 5x into which the engagement portion 6n is inserted while the locking member 6 is located at the second position. The engaged portion 5x has a groove shape in which a rear side 5f' of the hollow columnar portion 5f of the lower end opening is cut (see FIG. 10). When the locking member 6 located at the first position is rotated to the second position, the engagement portion 6n hits the lower end of the columnar portion 5f so that the lower arm portion 6g is slightly deformed downward and the lower arm portion 6g enters below the lower end of the columnar portion 5f and the engagement portion 6n enters the engaged portion 5x due to the elastic return of the lower arm portion 6g at a position in which the locking member 6 is rotated to the second position. Then, the locking member 6 located at the second position does not rotate toward the first position after the locking member 6 reaches the second position. Additionally, in the example illustrated in the drawing, the lower end of the columnar portion 5f is also provided with an additional engaged portion 5y into which the engagement portion 6n is inserted while the locking member 6 is located at the first position. The additional engaged portion 5y has a groove shape in which a lateral side 5f'' of the columnar portion 5f is cut (see FIG. 10). When the locking member 6 located at the first position is rotated toward the second position, the lower arm portion 6g is elastically deformed slightly downward so that the engagement portion 6n comes out from the additional engaged portion 5y and the rotation of the locking member 6 to the second position is allowed.

Further, in this embodiment, the locking member 6 is provided in both of the right and left side portions 5 of the bracket 3.

Accordingly, in this embodiment, the camera body 2b of the in-vehicle camera 2 temporarily installed in the bracket 3 as described above is permanently installed in the bracket 3 by rotating the locking member 6 provided in the left side portion 5 to the right from the first position to be located at the second position and rotating the locking member 6 provided in the right side portion 5 to the left from the first position so as to be located at the second position. Then, the right and left locking members 6 are operated at the same time so that a force biased to either the left side or the right side is not applied to the window glass through the bracket 3 when shifting to the permanent installation state.

The above-described bracket 3 and the cover attached to the outside of the bracket 3 from a state in which the camera body 2b of the in-vehicle camera 2 is permanently installed in the bracket 3 as described above constitute the in-vehicle device holding device.

FIGS. 11 to 16 illustrate an example of such a holding device. The cover 7 constituting the holding device is combined with the in-vehicle device bracket 3 by fitting.

The cover 7 includes a front surface portion 7a, right and left side surface portions 7b, and a bottom surface portion 7c, and opens upward and backward.

A front fitting portion 8 and a rear fitting portion 9 are provided on the inner surface side of each of the right and left side surface portions 7b of the cover 7.

Each of the right and left side surface portions 7b of the cover 7 is provided with a front support portion 7d which protrudes from the side surface portion 7b toward the center side of the cover 7 and a rear support portion 7f which protrudes similarly toward the center side of the cover 7.

The front fitting portion 8 is formed in a protrusion shape extending toward the rear side xb by integrating the front end thereof with a surface portion 7e facing the rear side xb of the vehicle in the front support portion 7d. In the example illustrated in the drawing, the front fitting portion 8 includes a base part 8a which extends in a direction substantially orthogonal to the surface portion 7e and an inclined part 8b which obliquely extends upward from the base part 8a.

The rear fitting portion 9 includes a lower piece 9a which extends toward the rear side from the surface portion 7g facing the rear side xb of the vehicle in the rear support portion 7f and an upper piece 9c which is located above the lower piece 9a, forms a bent portion 9b between the rear end of the lower piece 9a and the upper piece, and extends toward the surface portion 7g so that the free end 9d faces the surface portion 7g. The upper piece 9c is formed so that a distance between the upper piece and the lower piece 9a gradually increases as it goes toward the free end 9d.

On the other hand, the bracket 3 constituting the holding device includes a front fitting portion 10 and a rear fitting portion 11 in each of the right and left side portions 5.

The front fitting portion 10 is formed as a split groove 10a which extends from the front side of the side portion 5 toward the rear side xb of the vehicle. The front end of the split groove 10a opens to the front side xa of the vehicle and the rear end of the split groove 10a is located below the front side of the front support portion 5a'.

The rear fitting portion 11 is an outer surface of the rear part 5r of the side portion 5 and is formed by a hole formed in a front wall of a hollow projection portion 11a formed at a portion located above the rear support portion 5a''.

In the holding device, when the cover 7 is slid toward the rear side of the vehicle (a direction indicated by an arrow in FIG. 16) by sliding the upper edge of the cover 7 on the vehicle inside surface 1a of the front window 1 so that the bracket 3 enters into the cover 7 from the opened rear side of the cover 7 from a state in which the camera body 2b of the in-vehicle camera 2 is permanently installed in the bracket 3 as described above as illustrated in FIG. 16, the front fitting portion 8 is fitted to the front fitting portion 10 of the bracket 3 and the rear fitting portion 9 is fitted to the rear fitting portion 11 of the bracket 3 in each of the right and left sides of the cover 7. Accordingly, in this example, the cover 7 and the bracket 3 can be combined with one touch so that the cover 7 covers four directions except for the upper side and the rear side of the bracket 3 having the camera body 2b of the in-vehicle camera 2 inside the window glass (see FIGS. 13 to 15).

Figure 15:
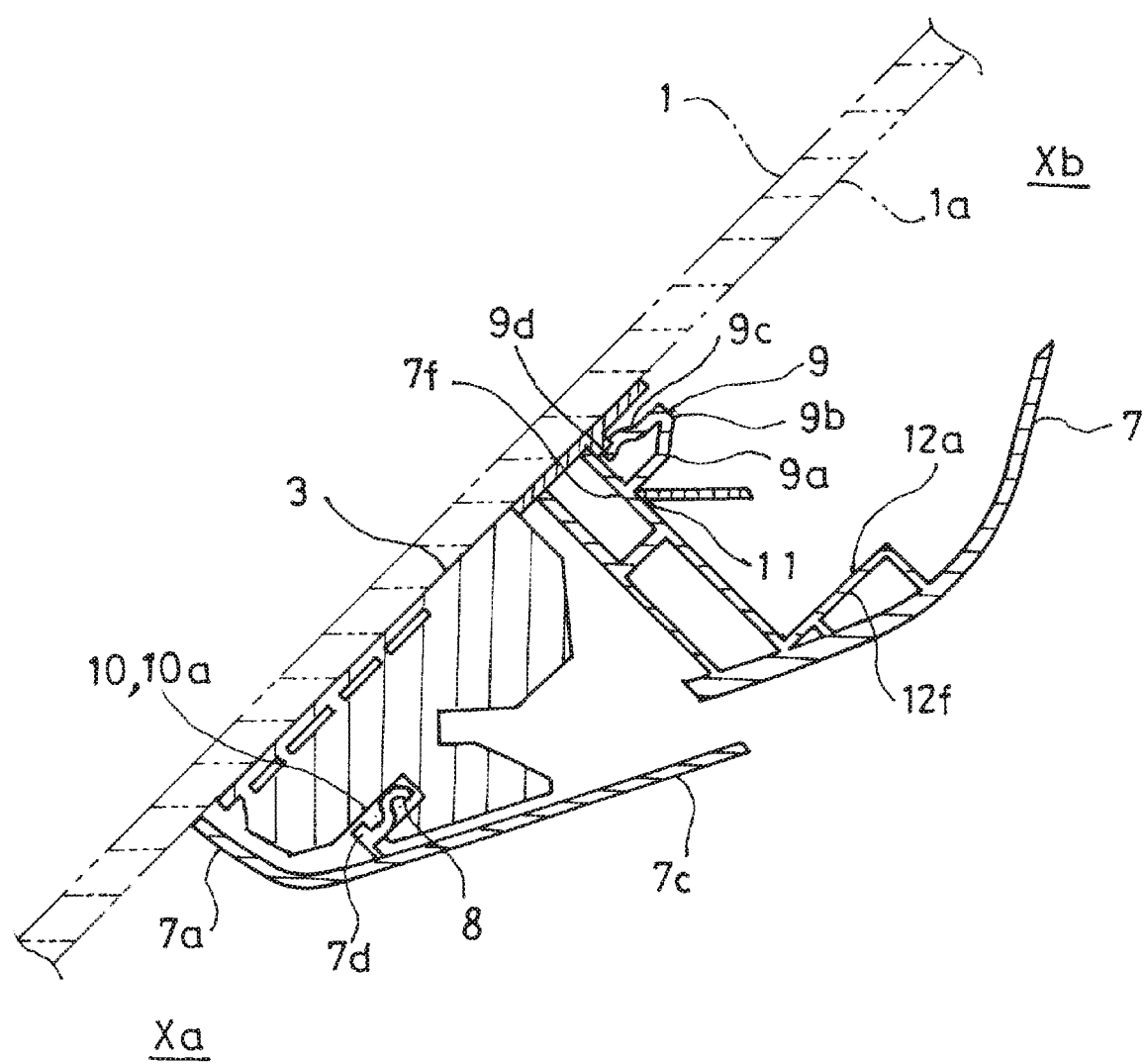
FIG. 15 is a cutaway cross-sectional view at a position of line A-A of FIG. 14.
Figure 16:
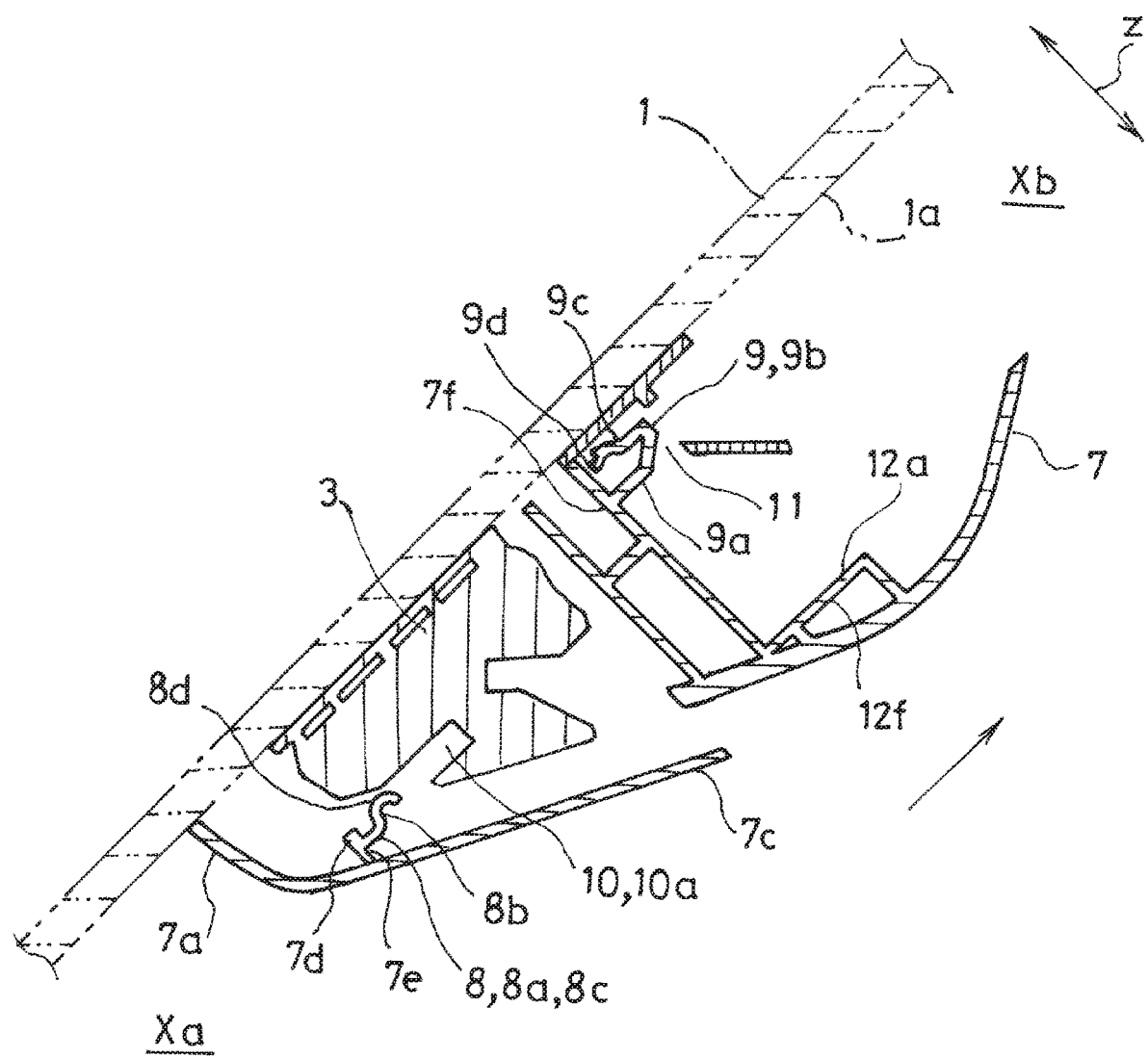
FIG. 16 is a cross-sectional view illustrating a state immediately before the cover constituting the holding device is combined with the bracket constituting the holding device at the cutaway position of line A-A of FIG. 14.

Specifically, as illustrated in FIG. 15, the width of the split groove 10a serving as the front fitting portion 10 is slightly narrower than the distance between the lower surface 8c of the base part 8a of the front fitting portion 8 and the uppermost surface 8d of the inclined part 8b, and the front fitting portion 8 is fitted into the split groove 10a while the rear end side thereof is slightly bent downward.

Further, the dimension of the hole which is the rear fitting portion 11 in the up to down direction z is slightly smaller than the distance between the base portion of the lower piece 9a of the rear fitting portion 9 and the free end 9d of the upper piece 9c, and the rear fitting portion 9 is fitted into the hole while the upper piece 9c is slightly bent downward and the free end 9d of the upper piece 9c inside the projection portion 11a engages with a hole edge of the hole of the front wall of the projection portion 11a.

Additionally, since the other components of the bracket 3 constituting the holding device are substantially the same as those of the bracket 3 illustrated in FIGS. 1 to 10, these substantially same components in FIGS. 11 to 16 will be denoted by the same reference numerals as the reference numerals used in FIGS. 1 to 10 showing the bracket 3 constituting the holding device and description thereof will be omitted.

Further, in the holding device, a blocking portion 12 which prohibits the movement of the locking member at the second position toward the first position while the cover 7 is combined with the bracket 3 as described above is provided inside the cover 7.

Such a blocking portion 12 is provided at a position between the rear support portion 7f and the bottom surface portion 7c of the cover 7 in each of the right and left side surface portions 7b of the cover 7.

In the example illustrated in the drawing, a plate-shaped body 12a which includes an inner side 12b following the front to rear direction x, an outer side 12c integrated with the inner surface of the side surface portion 7b of the cover 7, a front side 12d, and a rear side 12e and a lower surface 12f faces the inner surface of the bottom surface portion 7c of the cover 7, is supported at the rear side of the cover 7. A distance D (see FIG. 11) between the inner sides 12b of the right and left plate-shaped bodies 12a is substantially the same as a distance between the outer cylinders of the right and left side portions 5 of the bracket 3. Accordingly, in the holding device, when the cover 7 and the bracket 3 are combined with each other as described above, the movement of the locking member 6 toward the first position is prohibited by the inner side 12b of the plate-shaped body 12a located at the outside of the locking member 6 located at the second position. That is, in the holding device, the inner side 12b of the plate-shaped body 12a serves as the blocking portion 12.

The characteristics of the parts and components required to have elastic deformation properties in the above-described embodiments can be easily secured by forming such parts, all parts including such parts, and such components as plastic molded products.

Additionally, of course, the present invention is not limited to the above-described embodiments and includes all embodiments capable of achieving an object of the present invention.

The present invention claims priorities of Japanese Patent Application No. 2019-137002 filed on Jul. 25, 2019 and No. 2020-099166 filed on Jun. 8, 2020, the disclosures of which are incorporated herein as references.

REFERENCE SIGNS LIST

2g SUPPORTED PORTION
4 BASE
5 SIDE PORTION
5a SUPPORT PORTION
6 LOCKING MEMBER

What is claimed is:

1. A bracket for holding an in-vehicle device inside a window glass comprising:
   a base which is configured to be fixed to an inside surface of the window glass;
   right and left side portions which protrude downward from the base;
   a locking member that is assembled so as to be movable between a first position and a second position; and
   at least one support portion configured to receive a supported portion provided in the in-vehicle device and inserted between the right and left side portions from a lateral direction while the locking member is located at the first position,
   wherein the locking member is arranged to rotatably assemble a base portion of the locking member with one of the right and left side portions, and
   when the locking member is moved to the second position while the supported portion is received by the at least one support portion, the locking member is pressed against the supported portion so that the in-vehicle device is held in any of a front to rear direction and an up to down direction without rattling.

2. The bracket according to claim 1, wherein a free end of the locking member is located outside one of the right and left side portions when the locking member is located at the first position, and the free end is located behind the supported portion received by the support portion when the locking member is located at the second position.

3. The bracket according to claim 2, wherein the locking member includes a first part which is pressed, from below, against a portion protruding from an outer surface of the one of the right and left side portions in the supported portion received by the support portion, and a second part which is pressed against the supported portion from a rear side, at the second position.

4. The bracket according to claim 1, wherein one of the right and left side portions includes an engaged portion which engages an engagement portion of the locking member at the second position so as to maintain a state in which the locking member is located at the second position.

5. The bracket according to claim 1, wherein each of the right and left side portions includes the locking member.

6. A holding device comprising:
   the bracket according to claim 1; and
   a cover which is assembled with the bracket by fitting,
   wherein a blocking portion is provided inside the cover so as to prohibit movement of the locking member at the second position toward the first position in a combined state.

* * * * *